United States Patent [19]

Fite et al.

[11] Patent Number: 5,805,549

[45] Date of Patent: Sep. 8, 1998

[54] USING DEFECT READ FROM A DISK TO REPRESENT A MACHINE-READABLE CODE

[75] Inventors: Barry A. Fite; Michael L. Mitchell; Russ A. Kunz; Clifford R. Brannon, all of Terre Haute, Ind.

[73] Assignees: Sony Corporation, Tokyo, Japan; Digital Audio Disc Corporation, Terre Haute, Ind.

[21] Appl. No.: 626,359

[22] Filed: Apr. 2, 1996

Related U.S. Application Data

[62] Division of Ser. No. 346,423, Nov. 29, 1994, Pat. No. 5,513,169, which is a division of Ser. No. 132,709, Oct. 6, 1993, Pat. No. 5,400,319.

[51] Int. Cl.$^6$ .................................................. G11B 27/19
[52] U.S. Cl. .............................. 369/54; 369/48; 369/58; 369/52
[58] Field of Search ................................. 369/47, 48, 54, 369/58, 52; 360/48, 49, 53, 40; 253/462, 375, 469, 419, 472, 495

[56] References Cited

U.S. PATENT DOCUMENTS

| | | |
|---|---|---|
| 4,341,952 | 7/1982 | John et al. .............................. 369/273 |
| 4,498,146 | 2/1985 | Martinez ................................ 369/58 X |
| 4,677,604 | 6/1987 | Selby, III et al. ......................... 369/52 |
| 4,891,504 | 1/1990 | Gupta ........................................ 369/52 |
| 4,926,272 | 5/1990 | Takamatsu et al. ...................... 360/49 |
| 4,961,077 | 10/1990 | Wilson et al. .......................... 369/273 |
| 5,270,877 | 12/1993 | Fukushima et al. ..................... 360/48 |
| 5,430,281 | 7/1995 | Lentz et al. ............................. 235/454 |
| 5,532,992 | 7/1996 | Funamoto ............................. 369/58 X |

FOREIGN PATENT DOCUMENTS

0 549 488   6/1993   European Pat. Off. .

*Primary Examiner*—Thang V. Tran
*Attorney, Agent, or Firm*—Frommer Lawrence & Haug LLP; William S. Frommer

[57] ABSTRACT

A machine-readable serial number is formed on a CD-ROM by using a laser to selectively remove a reflective layer from the CD-ROM. Removal of the reflective layer creates defects in addressable information storage locations on the CD-ROM. The serial number is read by detecting the defects. The serial number is used in a software distribution system in which many different software programs are distributed on a single CD-ROM and an access code based on the desired software program and the serial number of a particular CD-ROM is used to "unlock" the desired program on the particular CD-ROM.

18 Claims, 7 Drawing Sheets

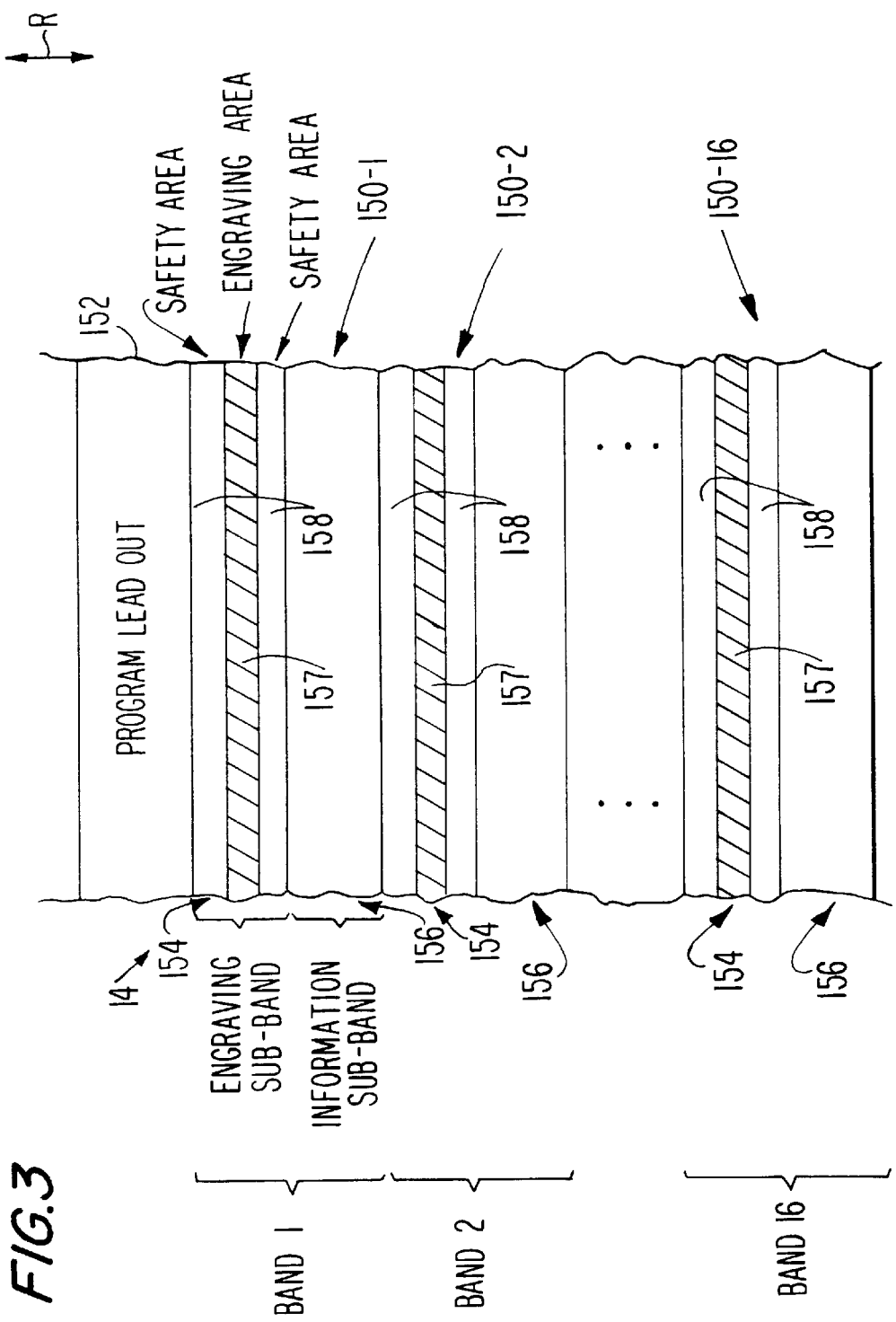

USING DEFECT READ FROM A DISK TO REPRESENT A MACHINE-READABLE CODE

This application is a division of application Ser. No. 08/346,423, filed Nov. 29, 1994, U.S. Pat. No. 5,551,169 which is a division of application Ser. No. 08/132,709 filed Oct. 6, 1993, U.S. Pat. No. 5,400,319.

FIELD OF THE INVENTION

This invention relates to optical information storage disks, and more particularly, to providing a machine-readable serial number code on such disks.

BACKGROUND OF THE INVENTION

It has been proposed to increase efficiency in the distribution of computer software by distributing many software programs on a single CD-ROM instead of distributing each program on a separate floppy disk or set of floppy disks. In this proposed distribution system, a customer who has the CD-ROM (hereinafter sometimes referred to as "the disk") in his possession and desires to obtain access to one of the programs on the disk purchases an access code which may be used to gain access to the desired program.

In order to carry out this software distribution system, it is desirable to provide a serial number or identification number on the disk in machine-readable form so that access codes can, through encryption, be limited to use with only one disk serial number, thereby preventing unauthorized use of the access code on more than one disk. However, the most efficient manner of producing CD-ROMs is by molding each disk from a master, which results in each disk containing identical recorded information. In other words, if a conventional mastering process is used to record a "serial" number on the disk, each disk formed from a given master will have the same "serial" number. It has been proposed to use approximately 20 different masters to produce compact disks which contain identical software program information, with each master respectively used to produce disks having an identification number that is different from the identification numbers of disks produced using different masters. However, this approach suffers from two drawbacks: First, the cost of mastering is significantly increased, and secondly, the number of different disk identification numbers is the same as the number of different masters, i.e. about 20, which makes it relatively easy for unscrupulous persons to locate disks having the same identification number and then to use a single access code to "unlock" the same program on all of the disks which have the same identification code.

It is also possible to use disk manufacturing processes without molding from a master, with a unique serial number being recorded on each disk at the same time the program software is recorded, for example by magneto-optical recording, but such processes are substantially more expensive than molding CD-ROMs from a master.

Another constraint on provision of serial numbers on CD-ROMs is the need for the serial number to be readable using conventional hardware such as generally available CD-ROM drives interfaced to personal computers.

OBJECTS AND SUMMARY OF THE INVENTION

Accordingly, it is an object of the present invention to provide a method of manufacturing an optical information storage disk having a machine-readable identification number, in which each disk which contains the same program information is formed by molding with the same master.

It is another object of the present invention that a large number of different identification numbers be provided on the respective disks.

It is still another object of the invention that the disk identification number be readable using conventional personal computer peripheral hardware.

In accordance with the invention, there is provided a method of forming a machine-readable code on an optical disk including the steps of forming a disk-shaped molded substrate which includes an information recording area in which information is represented by pits formed in the information recording area, applying a reflective coating to the information recording area, and removing the reflective coating from selected portions of the information recording area to form a code pattern.

According to another aspect of the invention, there is provided an apparatus for forming a machine-readable code pattern on a pre-recorded compact disk that includes a reflective coating on an information bearing substrate, the apparatus including means for rotating the disk about a center of rotation of the disk, a laser for selectively emitting a cutting beam, means for directing the cutting beam to a point at a selected distance from the center of rotation of the disk, and means for controlling the laser and the means for directing so that the reflective coating is removed from selected portions of the information bearing substrate to form the machine-readable code pattern.

According to still another aspect of the invention, there is provided an optical information storage disk in which a reflective coating is formed on a molded information bearing substrate and wherein the reflective coating is removed in a predetermined pattern from selected portions of the substrate to form a machine-readable code.

According to yet another aspect of the invention, there is provided a method of applying a human-readable serial number to an optical information storage disk having a machine-readable code formed thereon, the method including the steps of reading the machine-readable code formed on the disk, performing an encryption algorithm with respect to the machine-readable code to obtain an encrypted code, and applying the encrypted code to the disk in human-readable form.

According to a further aspect of the invention, there is provided a method of forming a machine-readable code on an optical information storage disk including the steps of forming a plurality of addressable information storage locations on the disk, with at least some of the storage locations containing program information, and creating defects in some of the information storage locations in a predetermined pattern so as to form a machine-readable code.

According to still a further aspect of the invention, there is provided a method of providing access to a selected one of a plurality of software programs stored in a CD-ROM, including the steps of inserting the CD-ROM into a CD-ROM drive interfaced to a personal computer, entering into the personal computer an access code for providing access to the selected one of the plurality of software programs, examining a plurality of information storage locations on the CD-ROM to detect defects in the information storage locations, establishing a disk identification code on the basis of results of examining the plurality of information storage locations, and verifying the entered access code on the basis of the established disk identification code.

By providing the methods and apparatus described above, a large number of software programs can be distributed on a single CD-ROM, using access codes for accessing each of the programs on the CD-ROM, with the codes being formed on the basis of serial numbers that are, for practical purposes, unique to each respective CD-ROM. Each CD-ROM which is to include identical information content can be formed using the same master, with the substantially unique serial number being formed on the disk after mastering and at a relatively low cost. Software provided in accordance with the invention allows the serial numbers to be read by conventional hardware including a standard PC connected to a conventional CD-ROM drive.

The above, and other objects, features and advantages of the present invention will be apparent from the following detailed description thereof which is to be read in connection with the accompanying drawings.

BRIEF DESCRIPTION OF THE DRAWINGS

FIG. 3 is an illustration of a band format used for forming a machine-readable code on a CD-ROM in accordance with a preferred embodiment of the invention;

DETAILED DESCRIPTION OF THE PREFERRED EMBODIMENTS

Figure 1A:
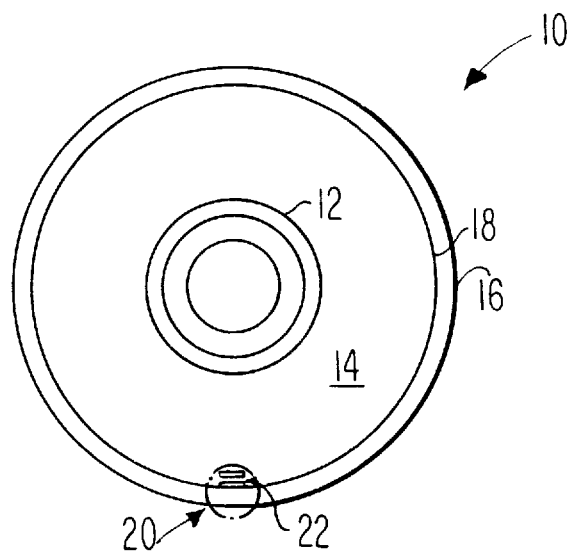
FIGS. 1A and 1B are schematic illustrations of a CD-ROM having a machine-readable code pattern formed thereon in accordance with the present invention.

There will first be described, with reference to FIGS. 1A and 1B, an optical recording disk having a machine-readable code pattern formed thereon in accordance with the present invention.

In FIG. 1, reference numeral 10 indicates an optical recording disk. The disk 10 is, except for the machine-readable code pattern and the code pattern area to be described below, preferably a conventional CD-ROM which is used for storing computer programs, digital data and the like for reproduction by a conventional CD-ROM drive provided as a peripheral device in a personal computer system.

The surface of the disk 10 is divided into a circular hub area 12, a relatively wide annular program or information storage area 14 that surrounds and is concentric with the hub area 12, and an outer mirror area 16 in the form of a rather narrow ring surrounding the program area 14. A circular boundary 18 is formed where the program area 14 meets the mirror area 16.

The CD-ROM 10 is preferably of the type, well known to those skilled in the art, which is manufactured by molding a polycarbonate disk-shaped substrate with a master to form a pattern of information storage bits in the program area 14. After molding, a reflective aluminum coating is applied to the polycarbonate substrate and then a protective layer of transparent ink is formed on top of the reflective coating.

The pits which represent the stored information are arranged in spiral or concentric tracks with a track pitch that is typically about 1.6 microns. Storage location addressing information or the like is arranged at regular intervals along the tracks.

In accordance with the invention, the program area 14 includes a code pattern area 20 near or adjacent to the boundary 18 between the program area 14 and the mirror area 16. A machine-readable code pattern 22 is formed in the code pattern area 20.

Figure 1B:
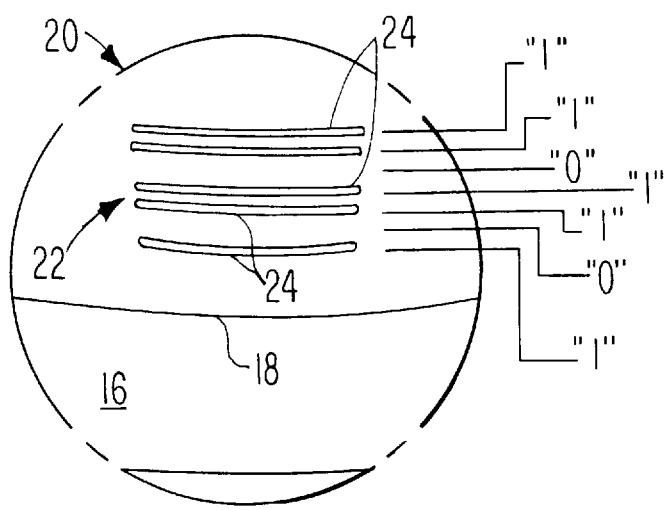

As best seen in FIG. 1B, the code pattern 22 is formed by a plurality of code pattern bands 24 which extend in parallel to each other in the circumferential direction of the disk 10. The code pattern bands are formed by removing the aluminum coating from the program area 14 at the places indicated by the bands 24, according to a method to be described below. The bands 24 are, in a preferred embodiment, rather narrow, having a width (in the radial direction of the disk 10) of approximately 25 microns. Preferably all of the bands 24 are of substantially the same width. The length of the bands 24 (in the circumferential direction of the disk 10) is determined in accordance with what is required for reliable reading of the code pattern by methods to be described below. In a preferred embodiment of the invention, the length of the bands 24 is around 5 to 10 millimeters.

The code pattern 22 illustrated in FIG. 1B represents a seven digit binary code in which the presence of a band in a particular location (i.e., the absence of the reflective coating at that location) is taken to represent the value "1", whereas the absence of the band (i.e., the presence of the reflective coating) at such a location is taken to represent the value "0". (It will be appreciated that the opposite convention could be used, in which the presence of a band was accorded the value "0", and the absence of the band was considered to indicate a "1".) Also, according to the convention to be used in the example of FIG. 1B, the bands are read proceeding radially outwardly from the innermost band. Thus, the code pattern 22 of FIG. 1D represents the binary number "1101101" (that is, 109 in decimal numerals), with the two innermost bands each respectively representing a "1" and being followed by a gap representing a "0", which is in turn followed by two bands representing "1"s, followed again by a gap for a "0" and concluding with an outermost band representing the final "1".

It will be recognized that by using a seven-bit code pattern as shown in FIG. 1B, up to 128 distinct machine-readable ID codes may be formed. However, it is within the contemplation of the invention to provide a larger number of distinct ID codes, utilizing eight or more binary bits, and in a preferred embodiment a sixteen-bit binary code is used.

FIG. 2 illustrates in block diagram form an apparatus 100 used for forming a machine-readable code pattern on a CD-ROM in accordance with the present invention.

Major portions of the apparatus 100 include a control and display section 102, an optical section 104 and a signal processing section 106. The apparatus 100 also includes a turntable 108 for receiving thereon and rotating a disk 10.

The control and display section 102 includes a motor 110 which is connected via a connecting mechanism 112 for controllably rotating the turntable 108 and the disk 10. The control and display section 102 also includes a control system 114 which is connected for controlling motor 110.

The control system 114 also performs a number of other functions, as described below, and preferably includes a conventional personal computer or the like, including a display 116 and a keyboard 118, by which a user interface is provided.

The optical section 104 includes a laser 120, which is preferably a conventional medium power device of the type designed for micro-machining, such as a Nd:YAG laser. The laser 120 emits a beam 122 that is adjustably directed via a beam deflector 124 and a lens system L1 onto the program area 14 of the disk 10. The laser 120 is selected, and the lens system L1 is arranged, so that the beam is focused on the surface of the program area 14 in a spot having a diameter of about 25 microns, and with sufficient power to vaporize the aluminum coating. The beam deflector 124 is selectively movable in directions indicated by arrows A for adjusting the point on the surface of disk 10 to which the focused beam 122 is directed. In a preferred embodiment of the invention the point of focus of beam 122 is adjustable among selected radial positions relative to a center of rotation of the disk 10. In other words, the axis along which the focused beam may be deflected preferably coincides with a radius of the disk 10.

The beam deflector 124 may take the form of a rotating mirror, an acousto-optic modulator, or a low-inertia scanning device such as a galvanometer.

The optical section 104 further includes a laser power control and modulation circuit 126, which provides on/off control, power level control and modulation of laser 120. The laser control circuit 126 is connected to receive control signals from control system 114 of control and display section 102.

As will be seen, the apparatus 100 is operable in a "read back" mode, and for this purpose a read back detector 128 and a beam splitter 130 are provided. The beam splitter 130 is positioned so as to direct to read back detector 128 a reflected beam 122' that is reflected back from the surface of disk 10 via the beam deflector 124.

Also included in the optical section 104 is an eccentricity compensator 132. As will be described below, the eccentricity compensator 132 cooperates with the control system 114 to provide precise positioning of the focused beam 122 on the surface of disk 10 relative to the program/mirror boundary 18.

The eccentricity compensator 132 includes a laser diode 134, a beam splitter 136, a lens system L2 and a photo detector 138. As will be discussed in more detail below, a beam 140 emitted by laser diode 134 is directed by beam splitter 136 and lens L2 to the nominal position of the boundary 18 on the surface of disk 10 and the beam 140 is reflected back from the surface of disk 10 to the photo detector 138. Although not shown in the drawing, it should be understood that a signal path is provided between the control system 114 and the laser diode 134 for on/off control of laser diode 134 by the control system 114.

The signal processing section 106 includes a signal conditioning and processing circuit 142, a deflector driving circuit 144 and a signal conditioning circuit 146. The signal conditioning and processing circuit 142 is connected to receive an output signal from the read back detector 128. The signal conditioning and process circuit 142 conditions and processes the detector output signal and provides a detection signal to the control system 114.

The deflector driving circuit 144 provides a driving signal to the beam deflector 124 for the purpose of controlling the positioning of the beam deflector 124 (and hence also the focusing point of the beam 122 with respect to the surface of the disk 10). The driving signal output from the deflector driving circuit 144 is based upon two input signals provided to the driving circuit 144. The first of the input signals is a radial position control signal provided from the control system 114, and is indicative of a selected radial position on the disk 10 to which the beam 122 is to be directed. As will be seen, in a preferred embodiment of the invention, the signal provided from the control system 114 to the driving circuit 144 is such as is required to direct the beam 120 to a selected one of 16 different radial positions relative to the center of rotation of the disk 10.

The other input signal received by the driving circuit 144 is a compensation signal provided from signal conditioning circuit 146. The signal conditioning circuit 146 is connected to receive an output signal provided from the photodetector 138 of the eccentricity compensator 132. Because all CD-ROM's are eccentric to some extent, it is necessary to provide eccentricity compensation to achieve the desired accuracy in forming the code pattern on the disk 10.

As will be described in more detail below, the photodetector 138 outputs a signal indicative of the degree of eccentricity of the disk 10. The signal output from the photodetector 138 is conditioned by signal conditioning circuit 146 to provide a compensation signal which is added at the driving circuit 144 to the radial position control circuit provided by the control system 114. As a result, the output signal from the driving circuit 144 provides desired radial positioning of the beam 122 on the surface of the disk 10, with compensation for the eccentricity of the disk 10.

In operation, a disk 10 which has been molded to form the information bearing pits in the aforementioned track arrangement, with the aluminum reflective coating having been applied to the molded substrate, is placed on the turntable 108 of the apparatus 100. Via the keyboard 118 an operator enters a command to start the process of forming the machine-readable code pattern and the control system 114 determines a serial number that is to be applied to the disk 10. For example, a serial number applied to an immediately preceding disk may be incremented to generate the serial number to be applied to the present disk 10. The serial number is either generated in binary form or is converted to binary form by the control system 114.

The apparatus then proceeds to form the code pattern 22 on the disk 10 by removing the reflective coating band by band with respect to the binary digits having the value "1" in the serial number to be applied to the disk. Before forming the first band, the disk 10 is rotated an initial time by means of turntable 108 and motor 110, and during the initial rotation of the disk the eccentricity compensator 132 is operated in a calibration mode. More specifically, the laser diode 134 is turned on, and the beam 140 emitted by the laser 134 is directed via the splitter 136 and the lens L2 onto a location on the surface of disk 10 that is selected to be the nominal position of the program/mirror boundary 18. The beam 140 is reflected back from the surface of disk 10 through the beam splitter 136 to the photodetector 138, which outputs a signal that represents the intensity of the reflected beam at the photodetector 138. Because disk 10 is eccentric, and the mirror area 16 is more reflective than the program area 14, the intensity of the reflected beam fluctuates over the period of rotation of the disk 10, and the output signal of the photodetector 138 fluctuates accordingly. The slope of the fluctuation indicates the phase and the degree of the eccentricity, and is used at the signal conditioning circuit 146 to form a compensation signal which compensates for the eccentricity in the disk 10.

The initial rotational period of the disk 10 also allows the operation of the turntable 108 and the control and display section 102 to become stabilized.

On the second rotation of the disk 10, the control system 114 outputs a radial position control signal to drive the beam deflector 124 to an appropriate position for directing the beam 122 of the laser 120 to a radial position on the disk 10 that corresponds to the first "1" bit of the binary serial number. The radial position control signal output from the control system 114 is provided to the deflector driving circuit 144, which adds the compensation signal from the signal conditioning circuit 146 and the radial position control signal from the control system 114 to form a driving signal that appropriately positions the beam deflector 124 to direct the beam 122 to the desired radial location on the disk 10, taking into account the eccentricity of the disk 10.

After the positioning of the beam deflector as just described, and during the second rotation of the disk, the control system 114 outputs a signal to the laser control circuit 126, which in turn drives the laser 120 so that it emits a beam 122 at a sufficient intensity to form a band in which the reflective coating is removed and for a predetermined period of time that is sufficiently long to form the band in a desired length, which may be from 5–10 mm, for example. At the end of the predetermined time, the laser beam 122 is turned off.

During the period in which the beam 122 is forming the first band, the radial position control signal remains constant, but the compensation signal from the signal conditioning circuit may be changed to compensate for eccentricity in the disk 10, so that the position of beam deflector 124 is adjusted to maintain the beam 122 at the desired radial position on the surface of disk 10 relative to the boundary 18.

During the next (i.e., the third) rotation of the disk, the control system outputs another radial position control signal to reposition the beam deflector so that the beam 122 will be directed to a radial position corresponding to the band for the next "1" bit. Again the beam 122 is turned on for the predetermined time period to form a band of the desired length. The time at which the beam is initially turned on to start forming the next band is controlled by the control system 114 to be substantially one period of rotation of the disk after the time at which the beam 122 was initially turned on to form the first band. The timing may be established by control system 114 on the basis of a known period of rotation of turntable 108, or alternatively may be based upon code pulses provided from an encoder (not separately shown) associated with motor 110.

Each of the bands corresponding to the remaining "1" bits of the binary serial number is formed in the manner just described. It will be understood that the period of the laser "burn" for forming each band is commenced at substantially the same phase of rotation of the disk 10, and continues for the same amount of time, so as to produce the code pattern 22 confined to the code pattern area 20 as shown in FIG. 1B.

Although the bands are shown in FIG. 1B as being substantially continuous, it should be noted that such bands could be produced by rapid pulsing of the engraving beam 122 as well as by continuous application thereof. Moreover, it is also within the contemplation of the invention that the bands consist of discrete engraved spots, which could be produced by pulsing the beam 122 less rapidly than a pulsing rate which produces continuous bands.

After the formation of the code pattern bands has been completed, the apparatus 100 preferably proceeds to a "read after write" mode, in which the satisfactory formation of the code pattern is checked. In this mode, the control system 114 sequentially controls the beam deflector 124 to deflect the beam 122 to positions corresponding to each of the 16 potential band locations and while the beam deflector is positioned for each potential band location, the control circuit 114 causes the disk 10 to be rotated through one or more rotations, while controlling the laser 120 to output a beam 122 in a relatively low power continuous wave mode. The low power beam 122 is directed to the particular potential band position by the deflector 124, with compensation for the disk's eccentricity, and is reflected from the surface of the disk 10 to form a reflected beam 122' which is directed to the read back detector 128 to provide a signal level indicative of whether the reflective coating is present or absent at the radial position on the disk 10 to which the beam 122 is directed. The output signal from the read back detector 128 is conditioned and processed by the signal conditioning and processing circuit 142 and the resulting signal is output to the control system 114. In this way the apparatus 100 "reads" each of the 16 potential band locations to determine for each location whether or not a band representing a "1" bit is present. The apparatus then compares the result of the reading to the binary number which was to be applied to disk 10 to confirm that the code pattern was properly formed.

If the read back process fails to confirm that the code pattern was properly formed, then appropriate action is taken, such as discarding the disk. Otherwise, if the formation of the proper code pattern is confirmed, the disk manufacturing process proceeds to completion.

Figure 2A:
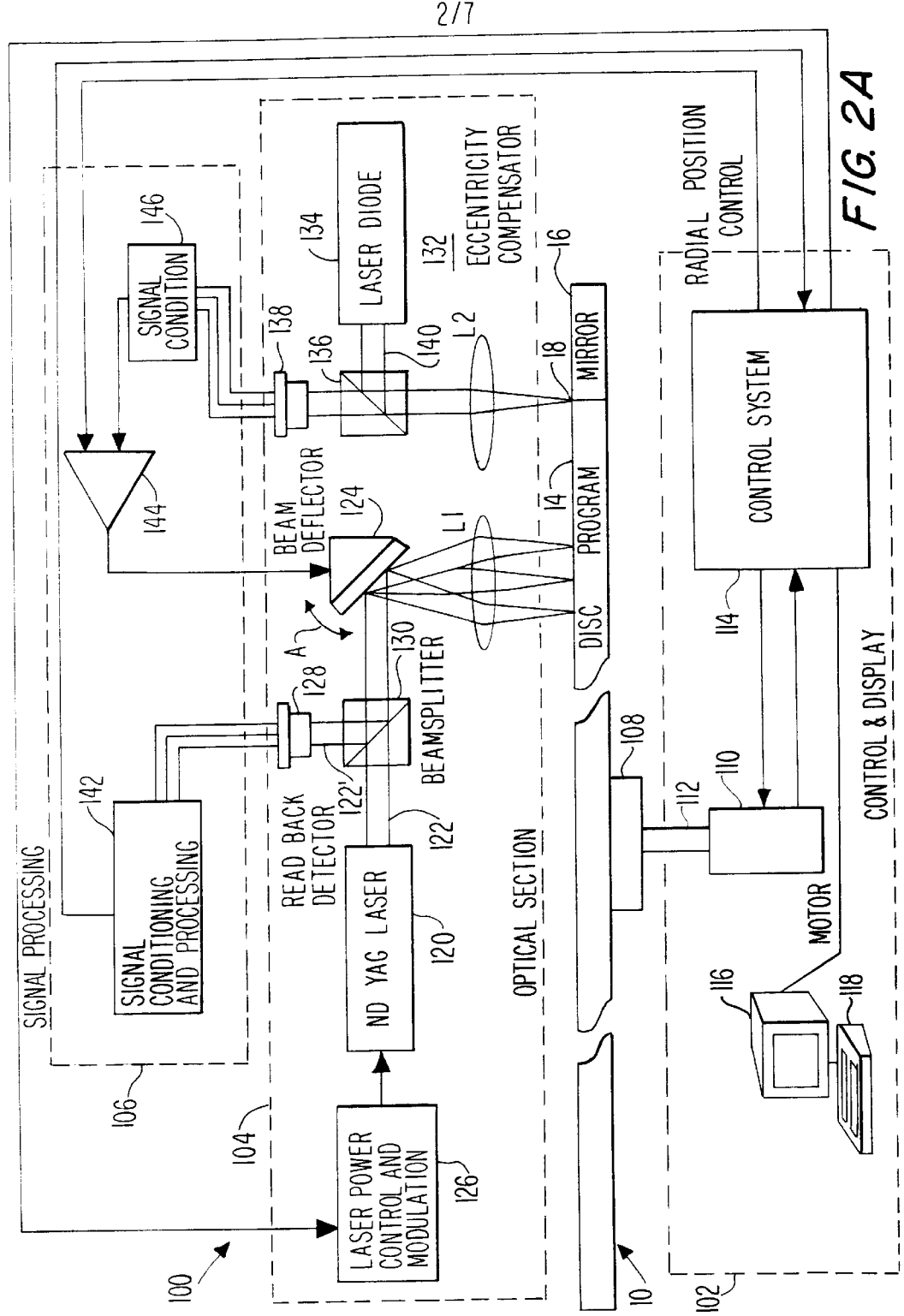
FIG. 2A is a block diagram of an apparatus for forming a machine-readable code pattern on a CD-ROM.
Figure 2B:
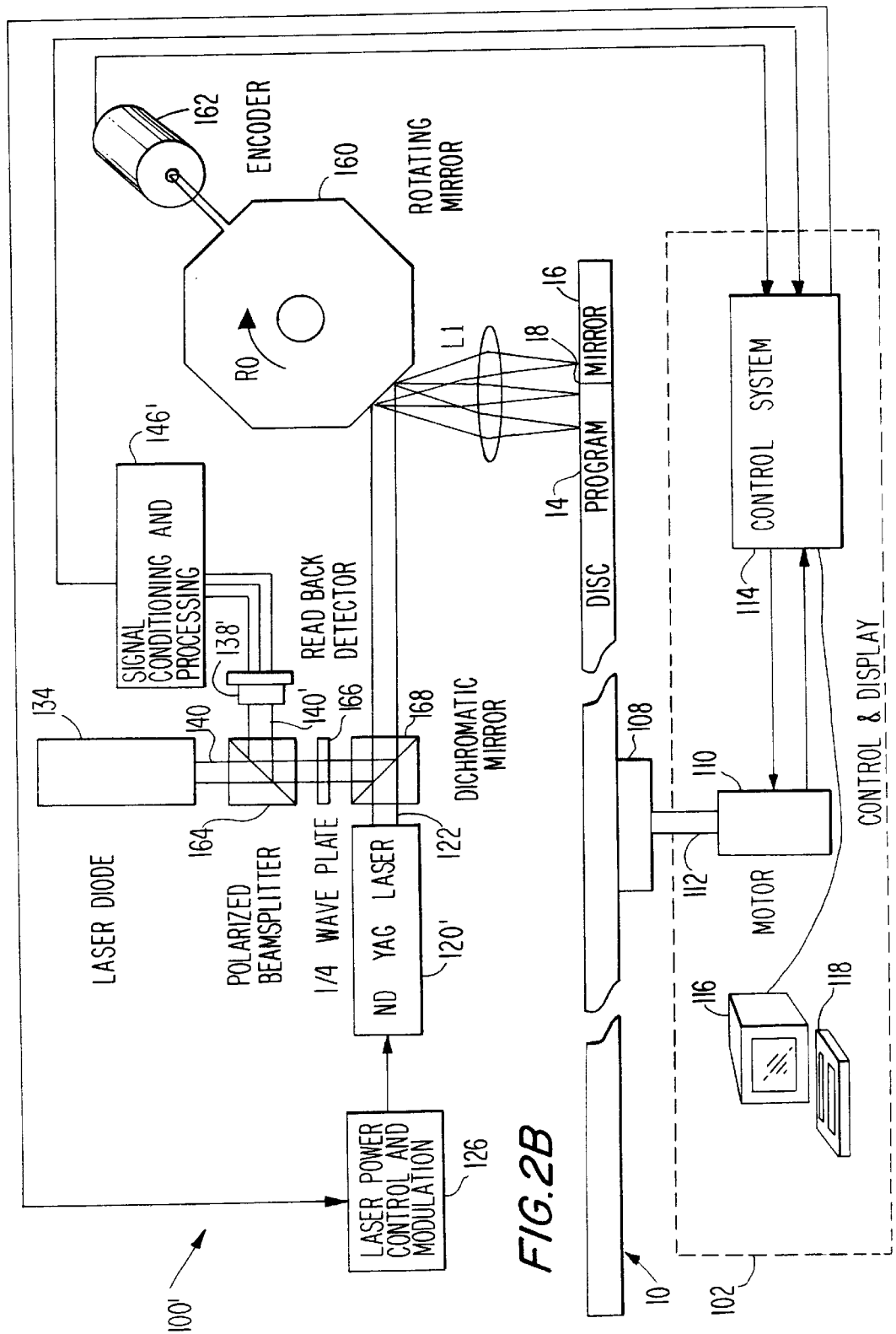
FIG. 2B is a block diagram of an alternative embodiment of an apparatus for forming a machine-readable code pattern on a CD-ROM.

An alternative approach to forming the code pattern shown in FIG. 1B is embodied in an apparatus 100' illustrated in block diagram form on FIG. 2B. Elements shown in FIG. 2B which correspond to the elements of FIG. 2A are given like reference numerals and will not be described in detail. Like the apparatus 100 shown in FIG. 2A, the apparatus 100' of FIG. 2B has a turntable 108 for rotating the disk 10, a control and display section 102, and an engraving laser 120' with its associated laser control circuit 126.

The apparatus 100' also includes a rotating mirror assembly 160 which functions as a beam deflector, and which, together with lens system L1, selectively directs the beam 122 from engraving laser 120' to desired radial positions on the surface of the disk 10. The rotating mirror assembly 160 includes a motor (not separately shown) for rotationally driving the mirror assembly 160 and an encoder 162 associated with the motor for providing encoder pulses to the system 114.

The eccentricity compensation function of the apparatus 100 (FIG. 2A) is performed in a different manner by the apparatus 100'. More specifically, the laser beam 140 produced by laser diode 134 and used for eccentricity compensation in the apparatus 100' (FIG. 2B) is directed to varying radial positions on the disk 10 by the rotating mirror 160 and lens L1 in a similar manner to the beam 122 of the engraving laser 120'. The optical path for the beam 140 from the laser diode 134 to the rotating mirror 160 includes a polarized beam splitter 164, a quarter wave plate 166, and a dichromatic mirror 168. The dichromatic mirror 168 is selected so as to be highly reflective at the wavelength of the beam 140 and highly transmissive at the wavelength of the beam 122. A return path for a beam 140' produced by reflection of the beam 140 from the disk 10 is provided via the lens L1, the rotating mirror 160, the dichromatic mirror 168, the quarter wave plate 166 and the polarized beam splitter 164, so that the reflected beam 140' is directed to a read back detector 138'. A signal output from the read back detector 138' is provided to a signal conditioning and processing circuit 146', which provides a detection signal to the control system 114.

The control system 114 is connected through signal paths which are not shown in the drawing to provide on/off control of the laser diode 134 and of the motor for the rotating mirror assembly 160.

In operation, a binary serial number to be applied in machine-readable form to the disk 10 is generated in the same manner as in the apparatus 100 of FIG. 2A. However, in the apparatus 100' (FIG. 2B) no initializing rotation of the disk 10 is required. Rather, with the disk 10 at rest in an arbitrary rotational position, the laser diode 134 and the motor in the rotating mirror assembly 160 are both turned on, with the rotating mirror assembly 160 being continually rotated at a constant rotational speed and the laser diode remaining on throughout the code pattern engraving operation now being described. The beam 140 emitted by the laser diode 134 is directed via the beam splitter 164, the quarter wave plate 166 and the dichromatic mirror 168 for reflection by the rotating mirror 160. Depending upon the instantaneous rotational position of the rotating mirror 160, the beam 140 may or may not be reflected from the surface of the disk 10 so that it is directed back to the read back detector 138'. Moreover, the rotating mirror assembly 160 is positioned with respect to the program/mirror boundary 18 of the disk 10 such that at some rotational positions of the mirror 160 a reflected beam 140' is returned from the mirror area 16 of the disk 10, and at other rotational positions of the mirror 160, the reflected beam 140' is returned from the program area 14 of the disk 10.

The output signal of the read back detector 138' and the conditioned detection signal by the signal conditioning and processing circuit 146' are indicative of the intensity of light incident upon the read back detector 138'. The intensity of light incident on the read back detector 138' is at a low level at times when the rotational position of the mirror 160 prevents the reflected beam 140' from reaching the read back detector 138'. The intensity of the light incident upon the read back detector 138' is at a high level when the beam 140' is returned to the read back detector 138' from the highly reflective mirror area 16, and the intensity is at an intermediate level when the beam 140' is returned from the moderately reflective program area 14. Accordingly, the detection signal provided from the conditioning and processing circuit 146' to the control system 114 is at one of three levels, namely a low level indicative of no beam return, a high level indicative of beam return from the mirror area 16, and an intermediate level indicative of a beam return from the program area 14. With constant rotation of the rotating mirror 160 in the direction indicated by the arrow Ro, the path of the beam 140 is continually changed from the rotating mirror 160 onward along an axis that substantially coincides with a radius of the disk 10. When the beam is incident upon the rotating mirror 160 at a rather acute angle, no reflected beam 140' is present at the read back detector 138', with the beam 140 being deflected to a position outboard from the disk 10. But with continued rotation of the mirror 160 the beam 140 is directed radially inwardly onto and across the mirror area 16, past the boundary 18 and on to the program area 14. Accordingly, the intensity of light incident on the read back detector 138' varies over time from a low level to a high level to an intermediate level during the progressive deflection of the beam 140 in a radially inward manner as just described. At the same times, respective signals indicative of the low, high and intermediate detected intensities are provided to control system 114. In particular, the control system 114 is adapted to note the transition from high intensity to intermediate intensity, which indicates the point in time at which the beam path is deflected across the program/mirror boundary 18. The time at which the deflected beam 140 crosses the boundary 18 is then used as a benchmark for code pattern engraving using the laser 120', so that the code pattern bands can be formed at a fixed distance from the boundary 18, notwithstanding eccentricity in the disk 10. It will be noted that this is possible because the engraving beam 122 shares the same beam deflection path with the eccentricity compensation beam 140.

Accordingly, at a predetermined time interval after the beam path crosses the boundary 18, the control system 114 causes the laser 120' to emit one or more intense pulses of the engraving beam 122 so as to form an engraved spot on disk 10 from which the reflective coating is removed. The predetermined delay period between when the beam crosses the boundary 18 and the time at which the laser 120' is actuated to form the engraved spot is selected so that the spot is formed in the code pattern band location which corresponds to the first "1" bit in the binary serial number to be applied to the disk 10. Then, after another predetermined delay, the laser 120' is again operated to engrave another spot at the radial location corresponding to the band for the next "1" bit in the serial number. This process continues during the same deflection pass of the beam path so that a respective spot is formed for each of the bands required for the "1" bits of the serial number. Although formation of all of the required spots in a single deflection pass is preferred, it is also contemplated that multiple passes, up to one deflection pass per spot, could be performed to engrave all of the required spots along a single radius of the disk 10 (i.e., at the same rotational position of the disk 10). The timing for establishing the delay periods after which engraved spots are formed may be based on a timing circuit within control system 114 or upon code pulses supplied to control system 114 from encoder 162.

After the respective spots have been formed at each of the "1" bit positions, the control system 114 outputs a signal to the motor 110 so that the disk 10 is rotated a very small distance by the turntable 108. The rotation is such that the radius along which the spots were just formed is at a very small angle to the disk radius which, after the rotation, coincides with the axis of deflection of the beam. For example, at the radial positions of the disk 10 at which the spots were formed, the displacement between the radius upon which engraving was just performed and the radius now coinciding with the beam deflection path may be in the range of 5 to 100 microns, or more.

After the small rotation of the disk, another set of spots corresponding to the "1" bit locations is then engraved along the new radius in the same manner as just described (i.e., at the same time delays after the beam deflection path crosses the boundary 18), and the disk is then rotated again by the same small amount and the process is repeated until bands of the desired length have been formed. With an engraved spot diameter of approximately 25 microns, it will be appreciated that a substantially continuous band is formed if the intermittent rotation between engraving operations is in the lower end of the 5–100 micron range mentioned above, whereas with rotation within or beyond the upper end of the range, bands consisting of discrete spots will be formed.

The number of radii of the disk along which spots are formed depends on the desired density of the spots and the desired length of the bands. For example, the number of radii may be 50 or more, which implies that 50 or more radial passes of the engraving beam are carried out.

It should be noted that in the beam path provided for the eccentricity compensation beam 140, the quarter wave plate 166 increases the intensity of the reflected beam 140' at the read back detector 138' by changing the linear polarization of the outward bound beam 140 to a circular polarization and by changing the resulting circular polarization of the reflected beam back to a linear polarization in the return path of the reflected beam 140'. However, the quarter wave plate 166 can be dispensed with if the laser diode 134 is selected to have a more powerful output beam and/or more sensitive detection circuitry is provided.

With the arrangement as shown in FIG. 2B, a relatively inexpensive Nd:YAG laser, operable only in a pulsed mode, can be used. However, it is within the contemplation of the invention to substitute a more expensive Nd:YAG laser, which is operable in a continuous wave mode as well as a pulsed mode. With such an Nd:YAG laser, the laser diode 134 and the quarter wave plate 166 can both be dispensed with, and the Nd:YAG can be operated in a low power continuous wave mode to provide the reflected beam used for detecting the time at which the beam path crosses the boundary 18 on the disk 10.

According to alternative embodiments of the invention, the formation of the code pattern by vaporizing selected portions of the aluminum reflective coating is performed either before or after application of the transparent protective ink layer over the aluminum reflective coating. If the vaporizing of the reflective coating is performed after the protective layer has been applied, then the protective layer is vaporized along with the reflective coating, but residual heat after removal of the laser beam causes the protective layer to flow from adjacent areas to cover the locations from which the material was vaporized, so that the protective layer is reformed over the bands removed from the reflective coating.

FIG. 3 illustrates additional details concerning the format in which the code pattern bands are formed. As mentioned before, in a preferred embodiment of the invention a 16 bit machine-readable code is to be formed so that 16 bands 150-1, 150-2, . . . , 150-16 are provided, respectively corresponding to 16 bit locations. The bands 150-1 - - - 150-16 are arranged one after the other, proceeding radially inwardly from a program read out area 152.

It should be understood that FIG. 3 is presented on a scale such that the curvature of the bands 150 is negligible, and the bands 150 are presented as being parallel in the circumferential direction of the disk 10, which is indicated by the arrows C. Also, only a small portion of these bands 150 is shown in FIG. 3, inasmuch as the band format extends around the entire circumference of the disk 10. The width of each band 150 (i.e., its dimension in the radial direction indicated by the arrows R) is approximately 100 microns. Thus all 16 of the bands 150 together make up an annular region of the program area 14 having a width of about 1.6 mm. Each of the bands 150 is divided approximately evenly in the circumferential direction to form an engraving sub band 154 and an information sub band 156, each having a width of about 50 microns.

Each engraving sub-band 154 is in turn divided into an engraving area 157 between safety areas 158. The engraving areas 157 and safety areas 158 extend in the circumferential direction of the disk 10 and the engraving areas have a width (i.e. a dimension in the radial direction) of about 25 microns, with each of the safety areas having a width of about 15 microns. If an engraved band representing a value "1" is to be formed with respect to a particular bit, the engraving is performed within the engraving area 157 of the band 150 which corresponds to that bit. The safety areas 158 are provided as buffers in case of mechanical instability or the like during engraving. The information sub-bands 156 are kept free of engraving whether or not the respective bit is to have a value "0" or "1". In this way, track addressing information will be preserved in the information sub-bands 156 to facilitate the code reading operation which will be described below. These areas may also be used to store special instructions for the CD player, software version numbers and the like. Alternatively, some or all of the information sub-bands 156 may be allocated as additional potential bit locations, to increase the number of bits in the code.

It is also contemplated to modify the format of FIG. 3 by, for example, increasing the width of one or more of the engraving sub bands 154 or information sub bands 156. For instance, the information sub bands of the last two bands 150 may be increased in width to about 200 microns each.

Figure 4:
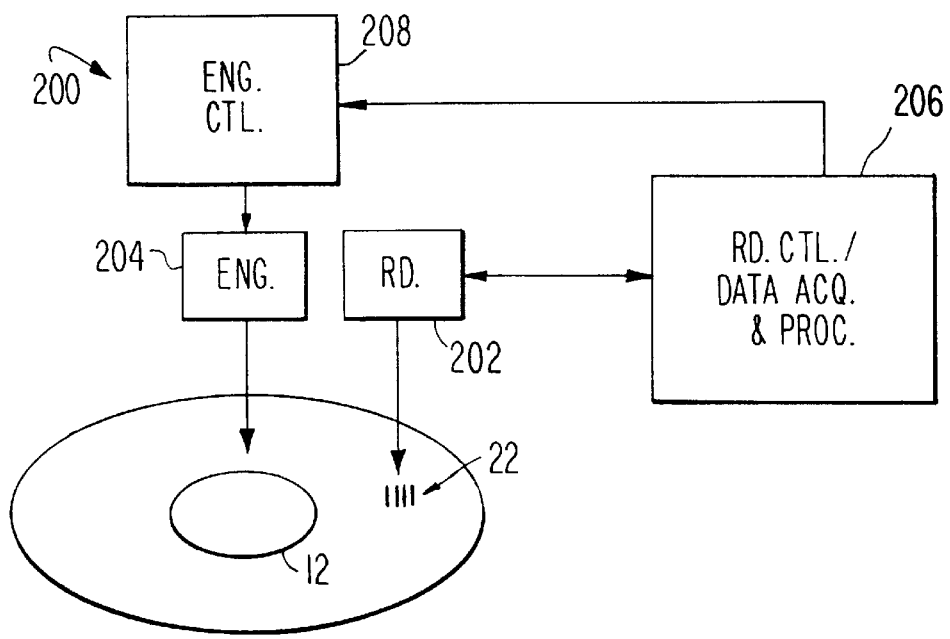
FIG. 4 is a block diagram of an apparatus for reading a machine-readable code pattern from a CD-ROM and applying a human-readable serial number to the CD-ROM, in accordance with the present invention.

There will now be described a method by which a human-readable serial number is applied to a disk 10 upon which a machine readable code has been applied as previously described. Referring to FIG. 4, an apparatus 200 for applying a human-readable serial number is shown in schematic form. The apparatus 200 includes a reading optics section 202, an engraving optics section 204, a reading control/data acquisition and processing section 206 and an engraving control section 208. Although not explicitly shown in FIG. 4, it will be understood that the apparatus 200 also preferably includes a turntable or the like for rotating the disk 10.

Apparatus 200 may operate to read the machine-readable code pattern in a manner similar to the read-after-write mode of operation of the apparatus 100 shown in FIG. 2A. Accordingly, the reading optics section 202 may be embodied substantially in accordance with the optical section 104 shown in FIG. 2A, except that the Nd:YAG laser shown therein may be replaced with a relatively low power laser, since no engraving is required of the reading optics 202. The read control/data acquisition and processing section 206 controls the operation of the reading optics 202 and receives and processes signals provided through the reading optics section in a manner similar to the control system 114 and the signal processing section 106 shown in FIG. 2A, so that the section 206 shown in FIG. 4 may be embodied in accordance with the control system 114 and the signal processing section 106 shown in FIG. 2A. On the basis of the reading operation, the binary serial number represented by the code pattern 22 is read by the processing section 206, and then a predetermined encryption algorithm is performed with respect to the machine-readable serial number to provide an encrypted serial number that is to be applied in human-readable form on the disk 10. Signals representing the encrypted serial number are provided to the engraving control section 208, which controls the engraving optics section 204 so that the encrypted serial number is engraved in the form of alpha-numeric characters on disk 10, and preferably in the hub area 12 thereof. The engraving optics section 204 and the engraving control section 208 may take the form of conventional equipment used for engraving identification code symbols on CD-ROMs. In a preferred embodiment of the invention, the engraving optics section 204 includes a conventional laser cutting device such as a $CO_2$ laser.

Although it is preferred to apply the encrypted human-readable serial number by engraving, it is also within the contemplation of the invention to apply the human-readable number in the form of ink, either directly on the surface of the disk 10, or on a label that adheres to the disk 10. In both cases, the human-readable number is preferably applied in the hub area 12.

It is also within the contemplation of the invention that, for the purpose of applying the human-readable serial number, the machine-readable code pattern be read using apparatus and procedures as described below in connection with FIGS. 5 and 7.

Figure 5:
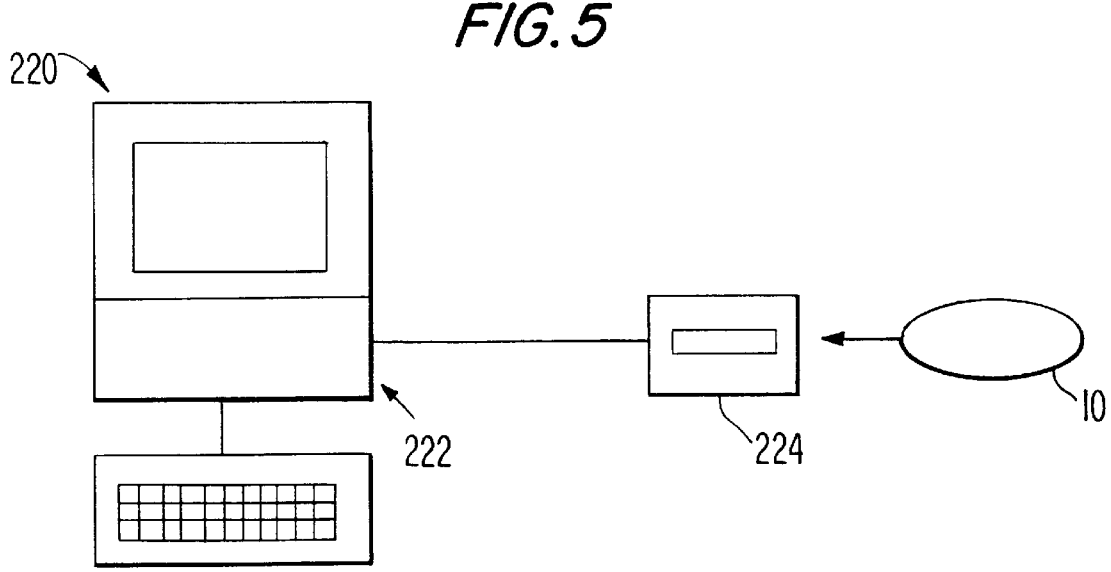
FIG. 5 is a schematic illustration of computer hardware in which a CD-ROM is loaded for controllably accessing software packages stored on the CD-ROM in accordance with the present invention.

FIG. 5 is a schematic illustration of a system 220 by which the machine-readable serial number on a disk 10 may be read in connection with a software package unlocking operation in accordance with the present invention. The system 220 may be made up of a conventional personal computer 222 to which a conventional CD-ROM drive 224 is connected as a peripheral device. To carry out the software unlocking operation to be described below, appropriate software in accordance with the invention is loaded into the PC 222 to control the operation of the system 220 for software package unlocking. For example, the software needed for the unlocking operation may be stored in unlocked form on the disk 10 and loaded into the PC 222 by way of the CD-ROM drive 224.

As previously indicated, the CD-ROM 10 preferably contains a large number of software packages, perhaps 100 or more, of which at least some are "locked" such that access to the packages can only be obtained if respective access codes are entered into the computer in which the packages are to be installed. Also, the disk 10 includes the machine-readable serial number code 22 (FIG. 1B) and a human-readable encrypted serial number applied as discussed above in connection with FIG. 4. If a customer desires to obtain access to one of the locked software packages on the disk 10, the customer reads the human-readable encrypted serial number from the disk and contacts the distributor of the disk. The customer provides the encrypted serial number to the distributor and indicates the software package which he desires to access, and also makes payment arrangements or the like. The distributor carries out a decryption algorithm with respect to the encrypted serial number provided by the customer in order to determine the serial number represented by the code pattern 22 on the disk 10 held by the customer. On the basis of the serial number represented by the code 22 of the particular disk 10 and a code representing the software package to be unlocked, an encryption algorithm is performed to produce an access code for unlocking the program from the particular disk 10 held by the customer. After confirming the payment arrangements, etc., the distributor communicates the access code to the customer. It will be appreciated that the communication between the customer and the distributor may include mail, data communication, oral conversation via telephone, or a combination thereof.

Figure 6:
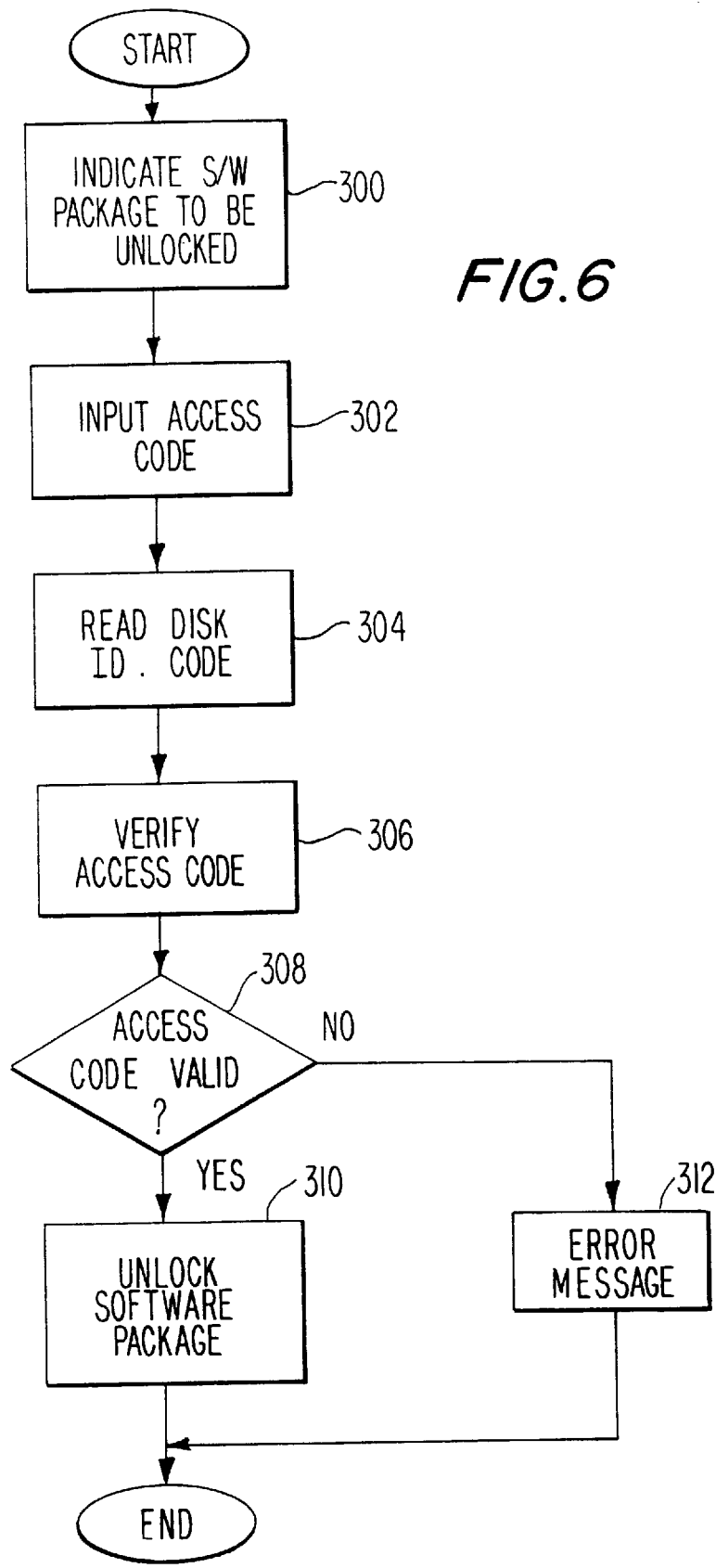
FIG. 6 is a flow chart which illustrates a software routine for controllably accessing a software package stored on a CD-ROM in accordance with the present invention.

FIG. 6 is a flow chart which illustrates a software routine carried out by the system 220 to unlock the desired software package on the disk 10 using the access code received by the customer from the distributor. The routine begins with a step 300, at which the customer, perhaps in response to an appropriate prompt, enters information, via keyboard entry or the like, which indicates the software package on the disk 10 which is to be unlocked. Step 302 then follows, at which the access code received from the distributor is entered, again perhaps by keyboard entry in response to a prompt.

If the disk 10 has not already been inserted in the CD-ROM 224, the system 220 prompts the customer to do so and then the system 220 proceeds to perform a sub-routine (represented by step 304) in which the serial number code pattern 22 on the disk 10 is read in a manner to be described in detail below. The routine of FIG. 6 then proceeds to step 306 at which the system 220 performs a decryption operation with respect to the access code entered by the operator to produce decrypted information which, if the access code is valid, will match the serial number read by the system 220 from the disk 10 as well as a code representing the software package to be unlocked. Alternatively, an encryption algorithm may be performed with respect to the serial number read by the system 220 at step 304 and the code indicative of the software package to be unlocked, and the result of the encryption algorithm is compared with the access code entered at step 302. In this case, the access code is considered to be valid if it matches the result of the encryption of the serial number and the software package code.

The routine of FIG. 6 branches at step 308, depending upon whether the access code was found to be valid. If so, the routine proceeds to step 310, at which the desired software package is unlocked by, for example, loading the software package from the CD-ROM 10 into the PC 222 so that the customer has access to the desired package. On the other hand, if the access code was found not to be valid, the routine branches from step 308 to step 312, at which an error message or the like is displayed indicating that the access code is invalid, access to the desired package will be denied, etc.

Figure 7:
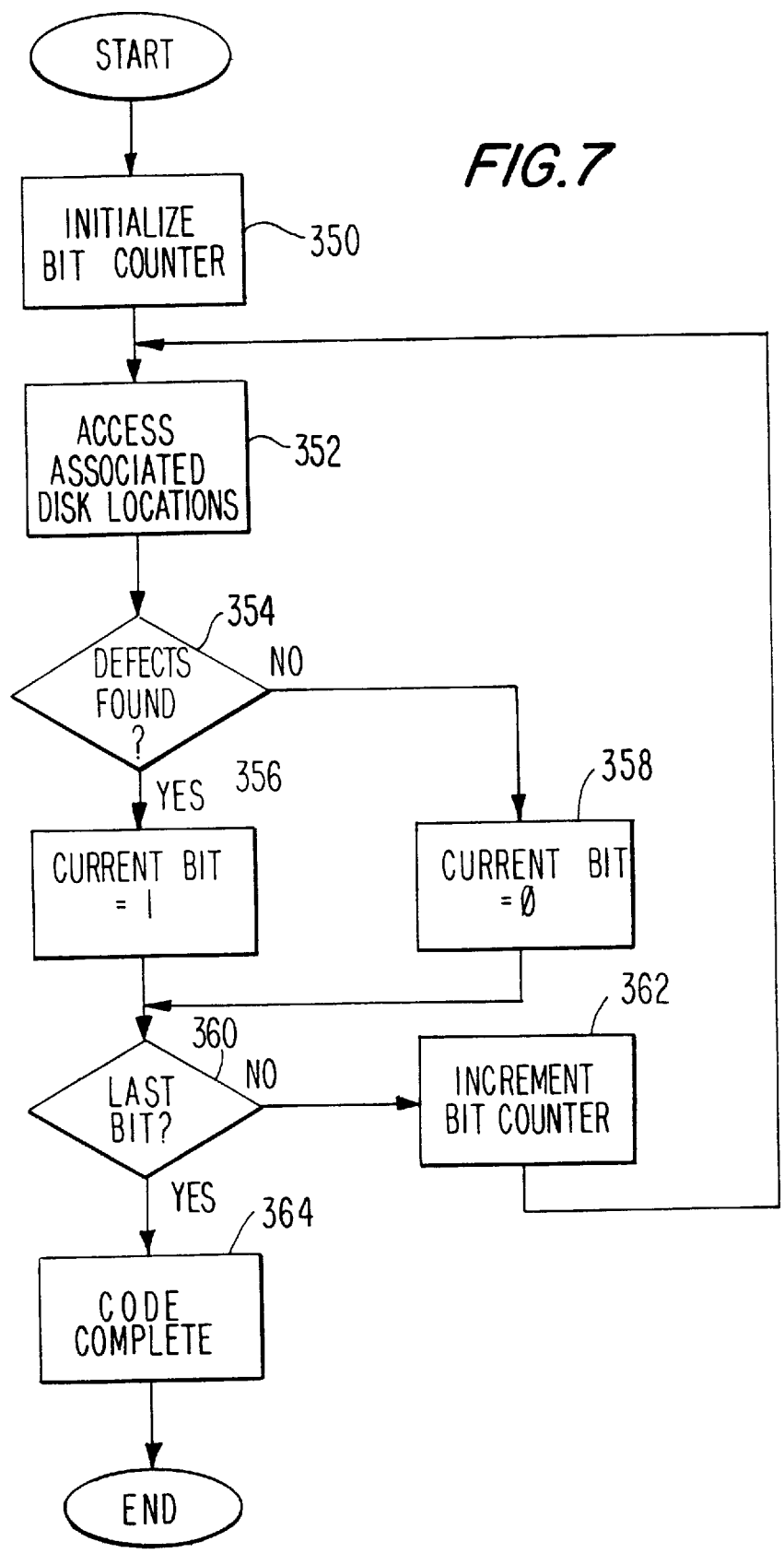
FIG. 7 is a flow chart which illustrates a subroutine for reading an ID code from a CD-ROM, and which is part of the routine illustrated in FIG. 6.

FIG. 7 is a flow chart which illustrates the sub-routine for reading the code pattern 22 represented by step 304 of FIG. 6. The sub-routine of FIG. 7 begins with a step 350 at which a bit counter is initialized, to the value "1" for example, and the routine then proceeds to step 352, at which the system 220 attempts to read specific predetermined storage locations on the disk 10 which correspond to the bit represented by the current value of the bit counter. The storage locations which are to be accessed at step 352 are all located in the engraving area 157 included in the band 150 for the bit represented by the current value of the bit counter. The address locations to be accessed with respect to each bit are sufficiently numerous, and are distributed within the engraving area for the corresponding band 150 in such a manner, that at least some of the address locations coincide with locations from which the reflective coating has been removed if the bit corresponding to the particular band 150 has the value "1", so that the addressing information is destroyed or unreadable and the address location cannot be accessed. Accordingly, and assuming the bit has the value "1", when it is attempted to read the address locations corresponding to the engraved spots or band, the PC 222 returns an error message indicating that there is a defect in the disk at the address location.

It is then determined at step 354 whether the number of defective address locations found at step 352 exceeds a predetermined threshold number. If so, it is determined that the value of the bit represented by the bit counter is "1" (step 356). However, if no defects are found, or the number of defects is less than the predetermined threshold, then the current bit value is set to "0" (step 358).

Accordingly, it will be seen that the value of the bit represented by the bit counter is determined by detecting the presence or absence of defects intentionally formed on the disk 10 by removing the reflective coating to prevent reading of address information. The determination is made by taking advantage of the routines typically provided in the software for operating the PC 222 and/or the CD-ROM drive for detecting disk defects.

Following step 356 or step 358, as the case may be, is step 360, at which it is determined whether the bit counter represents the last bit of the machine-readable code. If not, the routine proceeds to step 362, at which the bit counter is incremented and the routine then returns to steps 352–358 for determining the value of the next bit. The routine cycles through steps 352–362, thereby reading the code pattern 22 bit by bit on the basis of the presence or absence of defects in the respective engraving areas 157 of the bands 150, continuing until the last bit value has been determined. At that point, the code has been completely read, so that step 364 follows step 360.

In a preferred embodiment of the invention, the bands corresponding to the code bits are accessed proceeding radially inwardly from the outermost band or proceeding radially outwardly from the innermost band. However, it is also contemplated to read the bands in a scrambled order, and the writing operations previously described may also be performed in a radially inward, radially outward or scrambled order.

In the writing operations previously described, the defects formed to create the "1" bands were created by vaporizing the reflective coating in selected areas. However, it is also within the contemplation of the invention to form the defects in another manner such as adding an opaquing material at selected areas, or causing a chemical change on or below the surface of the disk which adversely affects reflectivity of the coating, so that in any of these cases defects are formed in addressable locations by rendering the addressing information unreadable, or the like.

In a preferred embodiment as described above, a 16 bit binary code was formed as the machine-readable serial number. It may, however, be advantageous to fix the value of one of the bits, e.g. by setting a first (innermost or outermost) bit value to "1" to serve as a sync bit for reading purposes, in which case the effective number of unique serial numbers would be reduced from approximately 64,000 to approximately 32,000. Even if the number of disks to be serialized exceeds 64,000 or 32,000, as the case may be, it is believed that either quantity of distinct serial numbers is sufficiently large to provide adequate security for the access codes. Nevertheless, if desired, the number of bits in the machine-readable code can be increased so that a unique serial number is provided for every one of the disks.

In the format described with respect to FIG. 3, the 16 bit code is formed in an annular area of about 1.6 mm in width, which occupies approximately 6.6% of the disk's information storage capacity. It will be noted that the code bands formed by removing the reflective coating are formed on a large scale as compared to the information storage tracks, which are typically at a pitch of about 1.6 microns, as compared to the approximately 25 micron width of the code bands. Moreover, the writing methods described above are not designed to place the code pattern area 20 at any particular predetermined position along the circumference of the disk 10, so that the entire annular region in which the code pattern area might fall must be reserved. For most applications the reduction in storage space caused by reserving the entire annular region is not significant. However, it is also within the contemplation of the invention to provide more precise placement of code pattern bands 24, or to replace the bands with isolated spots at particular locations, by providing more precise positioning of the engraving laser beam with respect to the addressable storage locations of the disk 10. This may be done, for example, using a modified version of a conventional CD-ROM drive, in which the low power reading laser is replaced with a higher power laser that can be selectively operated in a low power mode for reading an addressable location at which the laser beam is directed and a high power mode for creating a defect at that particular point. In this embodiment, the addressing information on the tracks of the disk 10 can be read in order to position the laser at desired spots at which defects are to be created.

Although the invention has been described primarily with reference to serializing of CD-ROMs, it will be understood that the invention is also applicable to CDs containing audio and/or video information or other types of information in addition to or instead of computer programs. Moreover, the invention is applicable to optical storage disks in a variety of formats, including the so-called "MiniDisc" format. Although the invention is particularly useful with respect to optical storage disks that are molded in large numbers from a single master, the invention is also applicable to disks manufactured in other ways, including magnetic or magneto-optical recording.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of reproducing data from an optical information storage disk, comprising the steps of:
    reading defects from a predetermined area on said disk, said defects representing a machine-readable code; and
    selectively reading and recovering information from another area on said disk as a function of said machine-readable code.

2. The method of claim 1 wherein said optical information storage disk includes a reflective coating, and said defects are formed by selected removal of said reflective coating.

3. The method of claim 2 wherein said predetermined area is disposed within and is separately readable from said another area.

4. The method of claim 2 wherein said predetermined area is disposed on said disk radially inward of said another area.

5. The method of claim 2 wherein said predetermined area is disposed on said disk radially outward of said another area.

6. The method of claim 1 wherein said machine readable code represented by said defects is indicative of the information in said another area.

7. The method of claim 1 wherein said storage disk admits of a particular one of plural applications and wherein said machine readable code represented by said defects is indicative of said application.

8. The method of claim 1, further comprising the steps of performing an encryption algorithm on said machine-readable code and using the encrypted code to enable said information from said another area to be read and recovered.

9. Apparatus for reproducing data from an optical information storage disk, comprising:
    optical pickup means for reading defects from a predetermined area on said disk, said defects representing a machine-readable code; and means for selectively reading and recovering information from another area on said disk as a function of said machine-readable code.

10. The apparatus of claim 9 wherein said optical information storage disk includes a reflective coating, and said defects are constituted by selected removal of said reflective coating.

11. The apparatus of claim 10 wherein said predetermined area is disposed within and is separately readable from said another area.

12. The apparatus of claim 10 wherein said predetermined area is disposed on said disk radially inward of said another area.

13. The apparatus of claim 10 wherein said predetermined area is disposed on said disk radially outward of said another area.

14. The apparatus of claim 9 wherein said machine readable code represented by said defects is indicative of the information in said another area.

15. The apparatus of claim 9 wherein said storage disk admits of a particular one of plural applications and wherein said machine readable code represented by said defects is indicative of said application.

16. The apparatus of claim 9, further comprising means for performing an encryption algorithm on said machine-readable code and means responsive to the encrypted code to enable said means for selectively reading and recovering information from said another area to read and recover said information.

17. A method of reading a machine-readable code formed on an optical information storage disk which includes a plurality of addressable information storage locations and a pre-recorded software program thereon, the method comprising the steps of:

examining selected ones of said plurality of addressable information storage locations;

determining as to each of said selected information storage locations whether said each location is defective;

recovering a code as a function of defective and nondefective information storage areas; and selectively enabling said pre-recorded software program to be read in response to the recovered code.

18. A method of reading a machine-readable code formed on an optical information storage disk which includes a plurality of addressable information storage locations and a program area in which at least one software program is pre-recorded, the method comprising the steps of:

examining selected ones of said plurality of addressable information storage locations, said selected information storage locations being disposed in said program area;

determining as to each of said selected information storage locations whether said each location is defective to recover said machine-readable code; and using the recovered code to execute said at least one software program.

* * * * *